United States Patent
Sudak et al.

[11] Patent Number: 5,569,076
[45] Date of Patent: Oct. 29, 1996

[54] OSCILLATION FIXED GRILLE OUTLET

[75] Inventors: John Sudak, Newmarket; Edoardo Panziera, Maple, both of Canada

[73] Assignee: Manchester Plastics, Troy, Mich.

[21] Appl. No.: 330,304

[22] Filed: Oct. 27, 1994

[51] Int. Cl.⁶ .................................................. B60H 1/34
[52] U.S. Cl. .................... 454/155; 454/316; 454/324
[58] Field of Search ................................. 454/108, 109, 454/152, 154, 155, 316, 324

[56] References Cited

U.S. PATENT DOCUMENTS

| | | |
|---|---|---|
| 142,807 | 9/1873 | Morrison . |
| 622,375 | 4/1894 | Leather ................................. 454/316 |
| 2,730,032 | 1/1956 | Greenmun . |
| 2,759,411 | 8/1956 | Jenson ................................. 454/316 |
| 3,736,858 | 6/1973 | Mercier ............................. 454/316 X |
| 3,861,281 | 1/1975 | Godwin ................................ 454/155 |
| 4,413,550 | 11/1983 | Piano . |
| 4,610,196 | 9/1986 | Kern .................................. 454/155 X |
| 4,635,395 | 1/1987 | Movshovitz et al. . |
| 4,664,022 | 5/1987 | Oddenino ............................ 454/155 |
| 4,669,370 | 6/1987 | Hildebrand et al. . |
| 4,699,322 | 10/1987 | Jobst . |
| 4,702,155 | 10/1987 | Hildebrand et al. . |
| 4,782,742 | 11/1988 | Yott et al. . |
| 4,887,520 | 12/1989 | Bauer . |
| 4,947,735 | 8/1990 | Guillemin . |
| 4,970,947 | 11/1990 | Soethout . |
| 5,188,561 | 2/1993 | Nissimoff et al. ................ 454/315 X |
| 5,242,325 | 9/1993 | Nukushina ........................ 454/315 X |

FOREIGN PATENT DOCUMENTS

| | | | |
|---|---|---|---|
| 2910125 | 9/1980 | Germany | .............................. 454/315 |
| 3044289 | 6/1982 | Germany | .............................. 454/155 |

Primary Examiner—Harold Joyce
Attorney, Agent, or Firm—Bliss McGlynn, P.C.

[57] ABSTRACT

An air outlet louver assembly (10) includes a housing (16) defining a first direction (40) of airflow, a louver support (42) which rotates about a support axis (44) within the housing (16), and a first set of fixed vanes (56) extending radially from the louver support (42) for directing airflow from the first direction (40) to a second direction (58). A second set of fixed vanes (60) extend radially from the louver support (42) for directing airflow from the first direction (40) to a third direction (62).

23 Claims, 3 Drawing Sheets

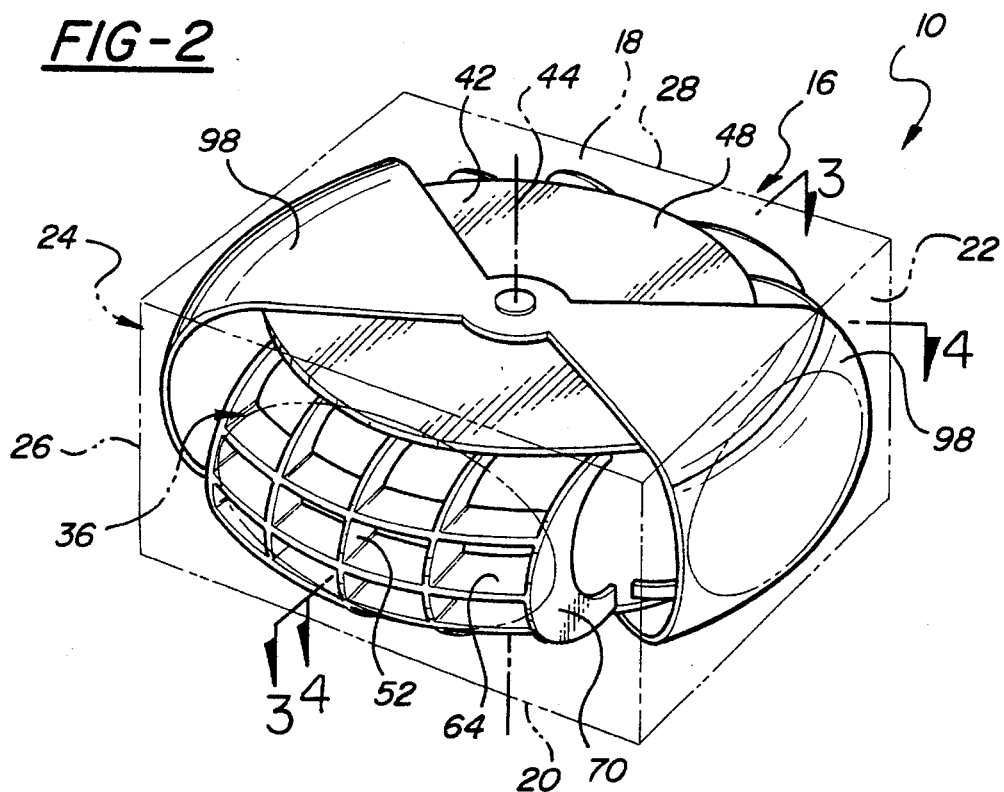
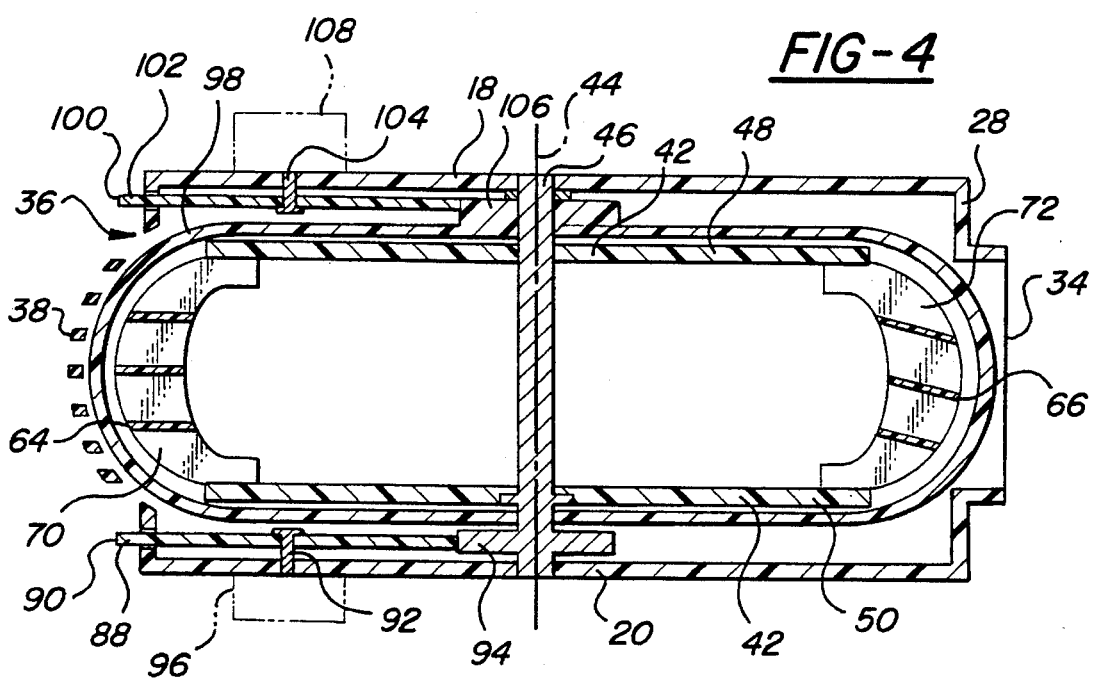

OSCILLATION FIXED GRILLE OUTLET

TECHNICAL FIELD

The subject invention relates to a ventilation system for adjustably controlling the direction of airflow into a passenger compartment of a motor vehicle.

BACKGROUND ART

Air outlet louver assemblies are commonly used in automotive ventilation systems to allow a user to adjust direction and volume of airflow into a passenger compartment of an automobile. Louver assemblies generally include one or two sets of directional vanes that are pivotably disposed within a housing and at least one control handle to adjust the position of the vanes within the housing. In addition, many louver assemblies include a damper door that pivots within the housing to adjust the volume of airflow through the housing. U.S. Pat. No. 5,338,252, of common assignee herewith, illustrates an outlet louver assembly of this type. For air outlet louver assembly of this type. For air outlet louver assemblies of this type, manufacturing and installation costs are high. It is thus desirable to make air outlet louver assemblies having fixed rather than pivotable vanes and wherein the set of vanes are rotated to change the direction of airflow. U.S. Pat. Nos. 4,669,370 and 4,702,155 to Hildebrand illustrates an air guide assembly and a ventilation system of an automobile vehicle. These two patents disclose an air guide assembly comprising an integral air guide element with a multiplicity of fixed air deflection fins or vanes. The air guide element is rotatably mounted by means of a ball and socket joint to a housing. The housing is insertable in a sleeve like receiving element on a dashboard panel of an automotive vehicle. In operation, the air guide element is rotated or pivoted about the ball and socket joint to change or control the direction of airflow. However, the Hildebrand air guide assembly does not provide incremental and accurate adjustment of the direction of airflow by providing a plurality of fixed vane sections, wherein each vane section directs air in a different direction.

SUMMARY OF THE INVENTION AND ADVANTAGES

The present invention provides a ventilation system for adjustably controlling the direction of airflow into a passenger compartment of a motor vehicle. The assembly comprises a housing having an air inlet end and an air outlet end and defining a first direction of airflow extending from the inlet end through the outlet end. The assembly also comprises a louver support supported within the housing for rotation about a support axis and a first set of vanes extending radially from the louver support for directing airflow from the first direction to a second direction when the first set of vanes are rotatably positioned adjacent to the outlet end. The invention is characterized by a second set of vanes extending radially from the louver support for directing airflow from the first direction to a third direction when the second set of vanes are rotatably positioned adjacent to the outlet end. The present invention is advantageous by providing at least two sets of fixed vanes, wherein each set of vanes directs airflow into a different direction when rotatably positioned adjacent to the outlet end, thereby providing incremental adjustment of the direction of airflow.

BRIEF DESCRIPTION OF THE DRAWINGS

Other advantages of the present invention will be readily appreciated as the same becomes better understood by references to the following detailed description when considered in connection with the accompanying drawings wherein:

FIG. 2 is a perspective view of the rotatable outlet louver assembly of the present invention;

FIG. 4 is a cross sectional view of the rotatable outlet louver assembly taken along line 4—4 of FIG. 2.

DETAILED DESCRIPTION OF THE PREFERRED EMBODIMENT

Figure 1:
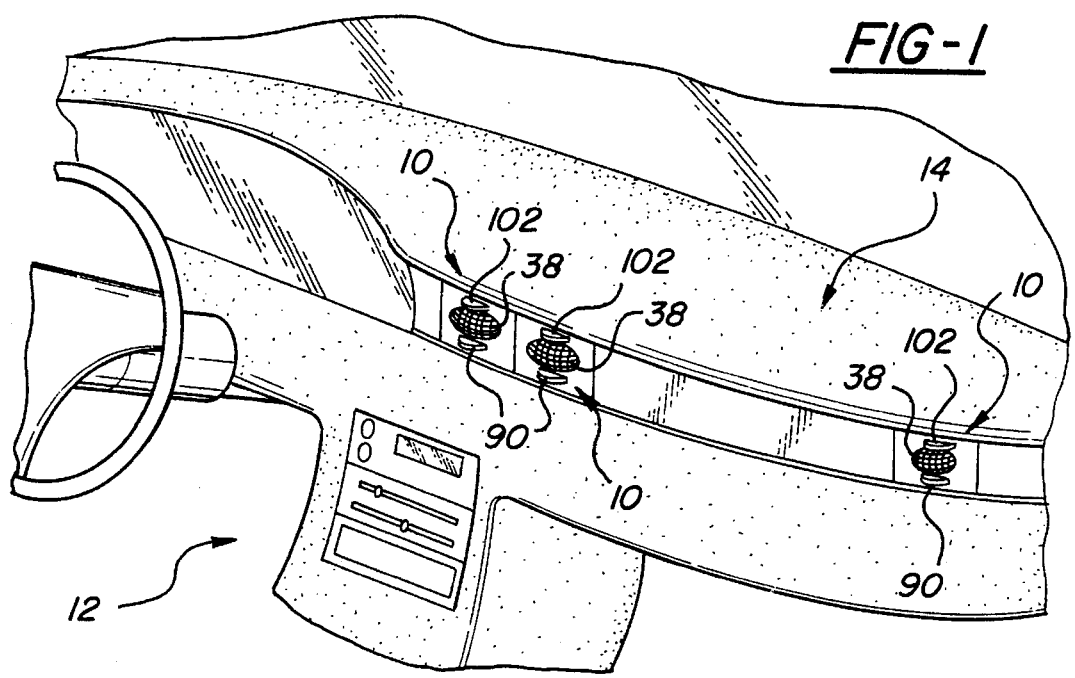
FIG. 1 is a perspective view of the rotatable outlet louver assembly of the present invention shown in its environment.

Referring to FIG. 1, the present invention provides a ventilation outlet assembly 10 for adjustably controlling the direction of airflow into a passenger compartment 12 of a motor vehicle. The ventilation outlet assembly 10 is shown mounted to the dashboard 14 of the motor vehicle. The ventilation outlet assembly 10 of the present invention can be mounted to other areas of the interior of the motor vehicle, such as the front or rear doors, in the front or rear center counsel, or disposed within the front or rear seats of the vehicle. The ventilation outlet assembly 10 of the present invention is preferably made from a plastic synthetic resin material, however other suitable materials may be used.

Figure 3:
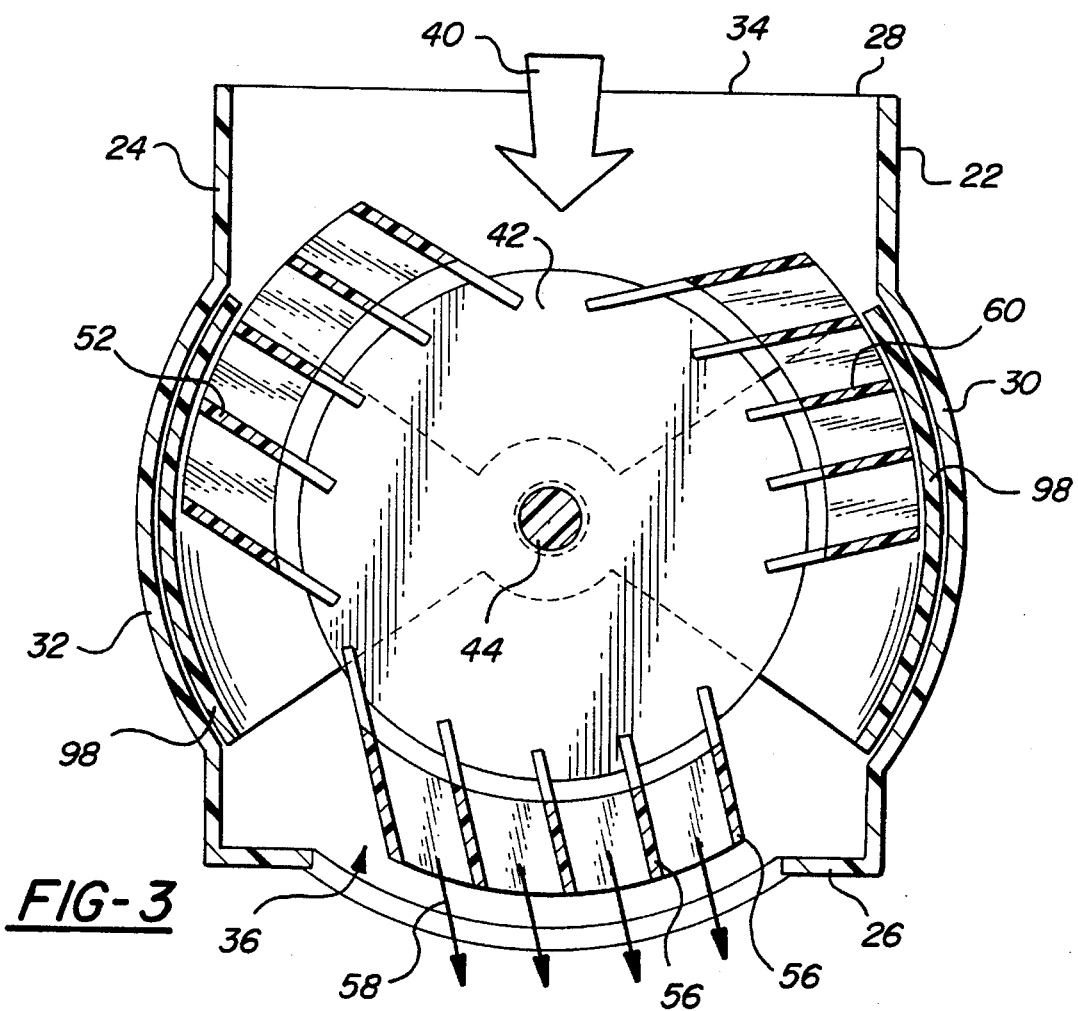
FIG. 3 is a cross sectional view of the rotatable outlet louver assembly taken along line 3—3 of FIG. 2 showing the first set of vanes positioned adjacent to the outlet end.

Referring to FIG. 2, the assembly 10 comprises a housing 16, as shown in phantom. The housing is rectangularly shaped and includes a top side 18, a bottom side 20 parallel to the top side 18, a first side 22, a second side 24 parallel to the first side 22, an air outlet end 26, and an air inlet end 28 parallel to the air outlet end 26. Referring to FIG. 3, the first and second sides 22, 24 each include a convex portion 30, 32 going outwardly from the middle therefrom. The air inlet end 28 includes an opening 34 as can best been seen in FIG. 4. The air outlet end 26 likewise includes an opening 36. The air outlet end 26 includes a grille 38 for covering the opening 36 therein. The housing 16 defines a first direction 40 of airflow, as shown in FIG. 3, which extends from the inlet end 28 to the outlet end 26. In other words, air is vented into the opening 34 in the inlet end 28 through the housing 16 and out of the opening 36 of the outlet end 26.

The assembly 10 further includes a louver support 42 supported within the housing 16 for rotation about a support axis 44. The louver support 42 includes a circular top plate 48 and a circular bottom plate 50. The top plate 48 is fixed relative to the bottom plate 50 and is parallel therewith. The top plate 48 and the bottom plate 50 are fixed to a cylindrical dowel 46, which is rotatably coupled at one end to the bottom side 20 of the housing 16 and at the other end to the top side 18 of the housing 16. The support axis 44 extends vertically through the center of the dowel 46, such that the louver support 42 rotates about the support axis 44 when the dowel 46 is rotated.

Figures 1, 5A:
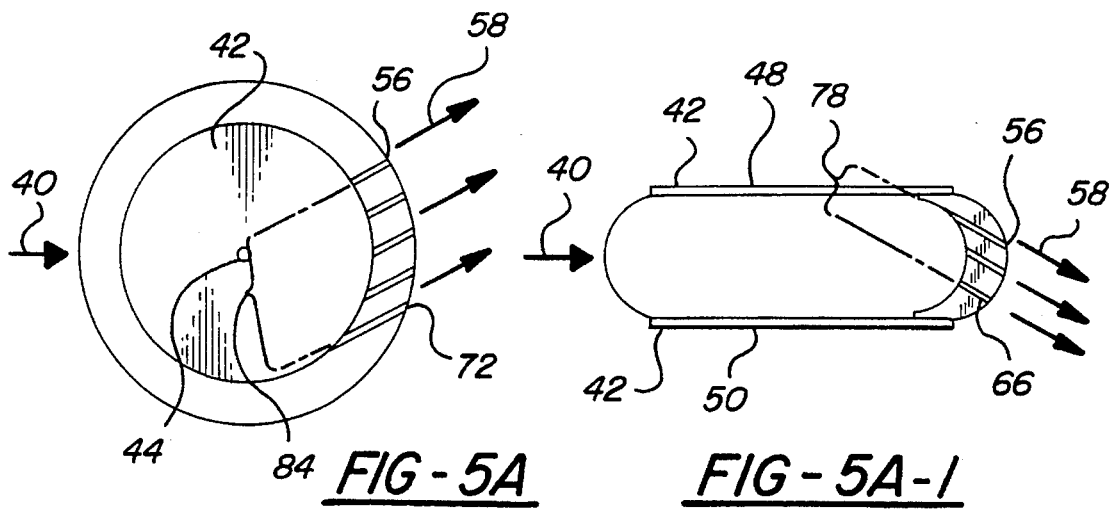
FIG. 5A is a top and side view of the first set of vanes of the rotatable outlet louver assembly of the present invention.

Referring to FIGS. 2 and 5A, the assembly 10 further includes a first set of vanes 56 fixed to and between the top plate 48 and the bottom plate 50 which extends radially therefrom for directing airflow from the first direction 40 to a second direction 58 when the first set of vanes 56 are rotatably positioned adjacent to the outlet end 26. In other words, the first set of vanes 56 direct the airflow in the second direction 58, when the first set of vanes 56 are positioned behind or adjacent to the opening 36 in the outlet end 26, as shown in FIG. 2.

Figures 1, 5B:
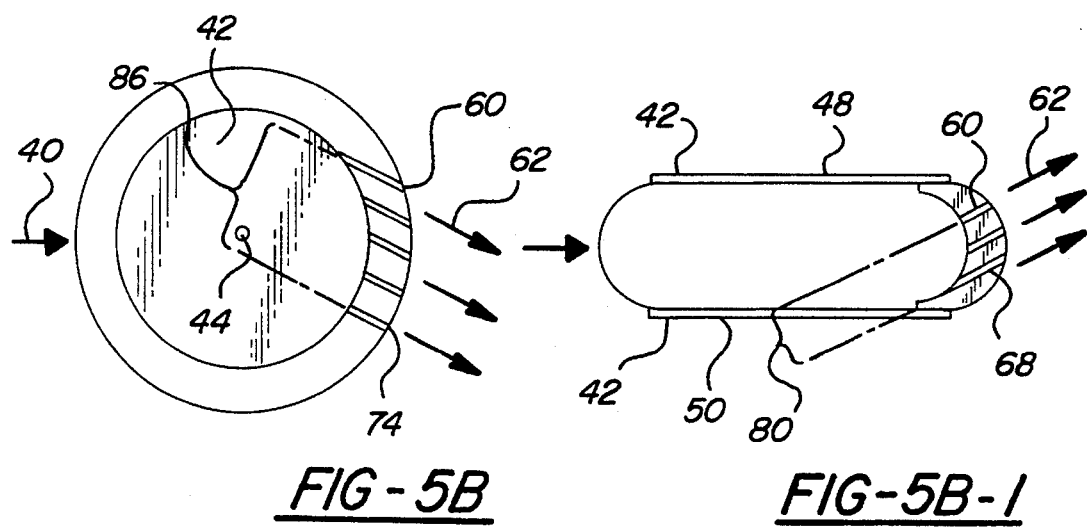
FIG. 5B is a top and side view of the second set of vanes of the rotatable outlet louver assembly of the present invention.

Referring to FIG. 5B, the assembly 10 is characterized by a second set of vanes 60, which are also fixed to and between the top support plate 48 and the bottom support plate 50, such that the second set of vanes 60 extend radially from the louver support 42 to direct airflow from the first direction 40 to a third direction 62 when the second set of vanes 60 are rotatably positioned adjacent to the outlet end 26 and in front of the opening 36. In other words, the second set of vanes 60 are rotated such that they occupy the space previously occupied by the first set of vanes 56 so that the second set of vanes 60 control the direction of air flowing out of the opening 36. Thus, the first and second set of vanes 56, 60 direct the air flowing into the opening 34 of the inlet end 28 in different directions when the vanes 56, 60 are rotated such that the vanes 56, 60 are adjacent to or behind of the opening 36 in the outlet end 26.

Figures 1, 5C:
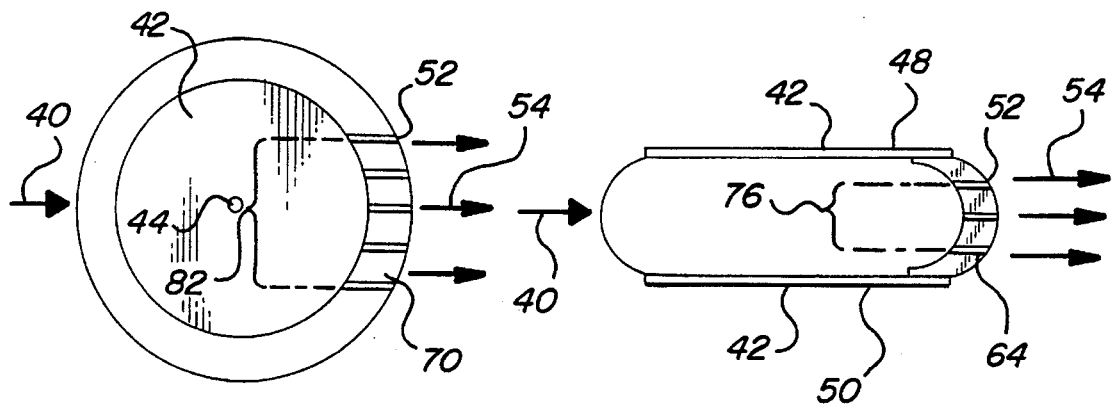
FIG. 5C is a top and side view of the third set of vanes of the rotatable outlet louver assembly of the present invention.

The ventilation assembly 10 is further characterized by a third set of vanes 52 which are fixed to and between the top plate 48 and the bottom plate 50 and coupled thereto, such that the third set of vanes 52 extend radially from the louver support 42. The third set of vanes 52 direct airflow from the first direction 40 to a fourth direction 54 when the third set of vanes 52 are rotatably positioned adjacent to the outlet end 26 and in front of or adjacent to the opening 36 therein. In the preferred embodiment, the third set of vanes 52 direct airflow in the first direction 40, that is the third set of vanes 52 continue to direct airflow in the first direction 40, or in other words, the fourth direction 54 is in the same direction as the first direction 40. The first, second, and third set of vanes 56, 60, 52 are fixed relative to the louver support 42 and have a generally semicircular shape, as can be seen best in FIGS. 2, 3 and 4. Additionally, the first, second, and third sets of vanes 56, 60, 52 are disposed in a circular pattern about the periphery of the top and bottom plates 48, 50. First, second, and third set of vanes 56, 60, 52 each include a set of horizontal vanes 66, 68, 64 respectively and a set of vertical vanes 72, 74, 70, respectively, as can be seen best in FIGS. 5A–5C. Horizontal vanes 66, 68, 64 are parallel to and spaced from one another and the vertical vanes 72, 74, 70 are parallel to and spaced from one another. The horizontal vanes 66 of the first set of vanes 56 lie in a first plane 78, the horizontal vanes 68 of the second set of vanes 60 lie in a second plane 80 different from the first plane 78 and horizontal vanes 64 of the third set of vanes 52 lie in a third plane 76 different from the first and second planes 78, 80. The vertical vanes 72 of the first set of vanes 56 lie in a fourth plane 84, the vertical vanes 74 of the second set of vanes 60 lie in a fifth plane 86 different from the fourth plane 84, and the vertical vanes 70 of the third set of vanes 52 lie in a sixth plane 82 different from the fourth and fifth planes 84, 86.

The ventilation outlet assembly 10 further includes first actuator means 88 operably associated with the louver support 42 for rotating the louver support 42 about the support axis 44. In the preferred embodiment, the first actuator means 88 includes a thumb wheel 90 rotatably coupled to the bottom side 20 of the housing 16 by a pin 92 extending through the thumb wheel 90 and into the bottom side 20. The thumb wheel 90 includes gear teeth (not shown). The dowel 46 includes a gear portion 94 which engages the gear teeth on the thumb wheel 90 such that rotation of the thumb wheel 90 causes rotation of the dowel 46 about the pivot axis 44 and between the top side 18 and the bottom side 20 of the housing 16. Since the support plate 42 is fixed to the dowel 46 at the top plate 48 and at the bottom plate 50, rotation of the thumb wheel 90 causes the first, second, and third set of louvers 56, 60, 62 and the top 48 and bottom 50 plates to rotate about the pivot axis 44. In addition to manual manipulation of the thumb wheel 90, the assembly 10 can include a first motor 96 operably associated with first actuator means 88 for receiving energy and converting the energy to mechanical motion to rotate pin 92, which in turn rotates thumb wheel 90, which in turn rotates dowel 46, which in turn rotates the first, second, and third 56, 60, 52 sets of vanes.

The outlet assembly 10 further includes a shutter 98 positioned between the housing 16 and the louver support 42. The shutter 98 is rotatably coupled to the dowel 46 such that the shutter 98 can rotate about the support axis 44 to prevent airflow from the inlet end 28 to the outlet end 26 when the shutter 98 is rotatably positioned adjacent to either the inlet end 28 or the outlet end 26. In other words, the shutter 98 can be rotated about the dowel 46 and positioned to block either opening 34 or 36 to thereby block airflow out of the opening 36. The shutter 98 can be rotated to either partially or completely block openings 34, 36. Thus, the shutter 98 acts as a damper to control the volume of airflow out of opening 36 and into the passenger compartment 12.

The assembly 10 further includes second actuator means 100 operably associated with the shutter 98 for rotating the shutter 98 about the support axis 44. Second actuator means 100 comprises a second thumb wheel 102 having gear teeth thereon (not shown) and a second pin 104 for rotatably coupling the second thumb wheel 102 to the top side 18 of the housing 16. The shutter 98 includes a coupling member 106 having gear teeth thereon (not shown) for engaging the gear teeth of the second thumb wheel 102, such that rotation of the second thumb wheel 102 causes rotation of the shutter about the dowel 46 and therefore about the support axis 44. In addition to manual manipulation of the second thumb wheel 102, a second motor 108 can be provided to cause rotation of the second thumb wheel 102. The second motor 108 is operably associated with second pin 104 for receiving energy and converting the energy to mechanical motion to rotate the second pin 104 which in turn rotates the thumb wheel 102, which in turn rotates the shutter 98 about the support axis 44. In the preferred embodiment, the dowel 46 and support axis 44 are perpendicularly disposed relative to first direction 40 and perpendicular to the top plate 48 and the bottom plate 50 of the louver support 42.

In operation, a user can use the first thumb wheel 90 or first motor 96 to rotate each set of vanes 56, 60, 52 to selectively position one of the set of vanes 56, 60, 52 behind or adjacent to the opening 36 in the inlet end 26. Thus, the operator can adjustably control the direction of airflow by rotation of the first thumb wheel 90 or operation of the first motor 96. The operator can adjust the volume of airflow by manual rotation of the second thumb wheel 102 or operation of the second motor 108 to cause the shutter 98 to rotate about the support axis 44 to either completely or partially cover the openings 34, 36 in the respective inlet 28 and outlet 26 ends of the housing 16.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A ventilation outlet assembly (10) for adjustably controlling airflow into a passenger compartment (12) of a motor vehicle, said assembly (10) comprising:

a housing (16) having an air inlet (28) and an air outlet (26) extending substantially in a common plane and defining a first air direction (40) of airflow extending from said inlet (28) through said outlet (26);

a louver support (42) rotatably supported within said housing (16) for rotation about a support axis (44);

a first set of vanes (56) connected to and extending outwardly from said louver support (42) in a first vane direction when said first set of vanes (56) are rotatably positioned adjacent to said outlet (26), the first vane direction directing airflow from said first air direction (40) to a second air direction (58); and a second set of vanes (60) connected to and extending outwardly from said louver support (42) in a second vane direction when said second set of vanes (60) are rotatably positioned adjacent to said outlet (26), said second vane direction different from said first vane direction and said second set of vanes adjacent and radially spaced from said first set of vanes (56), said second set of vanes directing airflow from said first air direction (40) to a third air direction (62) different from said second air direction wherein only one of said first or second sets of vanes is rotated to said outlet with the other of said sets rotated into said housing.

2. The ventilation outlet assembly (10) of claim 1 further characterized by including a third set of vanes (52) connected to and extending radially from said louver support (42) in a third vane direction for directing airflow from said first air direction (40) to a fourth air direction (54) when said third set of vanes (52) are rotatably positioned adjacent to said outlet end (26).

3. The ventilation outlet assembly (10) of claim 2 wherein said third set of vanes (52) including a plurality of vanes connected in parallel and are parallel to said first air direction (40).

4. The ventilation outlet assembly (10) of claim 2 further characterized by said first, second, and third set of (56, 60, 52) vanes having a semicircular shape.

5. The ventilation outlet assembly (10) of claim 4 wherein said first, second, and third set of vanes (56, 60, 52) are connected to said louver support about in circular pattern.

6. The ventilation outlet assembly (10) of claim 5 further characterized by said first, second, and third set of vanes (56, 60, 52) each including a plurality of horizontal vanes (66, 68, 64) and a plurality of vertical vanes (72, 74, 70).

7. The ventilation outlet assembly (10) of claim 6 wherein said plurality of horizontal vanes (66, 68, 64) are connected to said louver support parallel to and spaced from one another and said plurality of vertical vanes (72, 74, 70) are operatively connected parallel to and spaced from one another.

8. The ventilation outlet assembly (10) of claim 7 wherein said first, second, and third set of vanes (56, 60, 52) are fixedly connected relative to said louver support (42).

9. The ventilation outlet assembly (10) of claim 8 further characterized by one of said plurality of horizontal vanes (66) of said first set of vanes (56) connected in a first plane (78), one of said plurality of horizontal vanes (68) of said second set of vanes (60) connected in a second plane (80) different from said first plane (78), and one of said plurality of horizontal vanes (64) of said third set of vanes (52) connected in a third plane (76) different from said first and second planes (78, 80).

10. The ventilation outlet assembly (10) of claim 9 further characterized by one of said plurality of vertical vanes (72) of said first set of vanes (56) connected in a fourth plane (84), one of said plurality of vertical vanes (74) of said second set of vanes (60) connected in a fifth plane (86) different from said fourth plane (84), and one of said plurality of vertical vanes (70) of said third set of vanes (52) connected in a sixth plane (82) different from said fourth and fifth planes (84, 86).

11. The ventilation outlet assembly (10) of claim 10 further characterized by including first actuator means (88) operatively connected to said louver support (42) for rotating said louver support (42) about said support axis (44).

12. The ventilation outlet assembly (10) of claim 11 further characterized by including a first motor (96) operatively connected to said first actuator means (88) for receiving energy and converting said energy to mechanical motion to rotate said louver support (42) about said support axis (44).

13. The ventilation outlet assembly (10) of claim 12 further characterized by including a shutter (98) connected between said housing (16) and said louver support (42) for rotation about said support axis (44) to prevent airflow from said inlet end (28) to said outlet end (26) when said shutter (98) is rotatably positioned adjacent to one of said inlet or outlet ends (28, 26).

14. The ventilation outlet assembly (10) of claim 13 further characterized by including second actuator means (100) operatively connected to said shutter (98) for rotating said shutter (98) about said support axis (44).

15. The ventilation outlet assembly (10) of claim 14 further characterized by including a second motor (108) operatively connected to said second actuator means (100) for receiving energy and converting said energy to mechanical motion to rotate said shutter (98) about said support axis (44).

16. The ventilation outlet assembly (10) of claim 15 wherein said support axis (44) extends substantially perpendicular to said first direction (40) of airflow.

17. The ventilation outlet assembly (10) of claim 1 further characterized by including a grille (38) operatively connected to said housing for covering said outlet end (26) of said housing (16).

18. An assembly as set forth in claim 1 further characterized by said first set of vanes including a plurality of vanes connected to said louver support separate from and independent of said second set of vanes.

19. A ventilation outlet assembly (10) for adjustably controlling the direction and volume of airflow into a passenger compartment (12) of a motor vehicle, said assembly (10) comprising a rectangular housing (16) having a top side (18), a bottom side (20) parallel to said top side (18), a first side (22), a second side (24) parallel to said first side (22), a third side (26), and a fourth side (28) parallel to said third side (26); said housing (16) having an air inlet (34) in said fourth side (28) and an air outlet (36) in said third side (26) wherein said housing (16) defines a first direction (40) of airflow extending from said inlet (34) through said outlet (36); a louver support (42) supported within said housing (16) for rotation about a support axis (44) extending substantially perpendicular to said first direction (40) of airflow; a first set of vanes (56) extending radially from said louver support (42) for directing airflow from said first direction (40) to a second direction (58) when said first set of vanes (56) are rotatably positioned adjacent to said outlet (36); a second set of vanes (60) extending radially from said louver support (42) for directing airflow from said first direction (40) to a third direction (62) when said second set of vanes (60) are rotatably positioned adjacent to said outlet (36); a third set of vanes (52) extending radially from said louver support (42) for continuing to direct airflow in said first direction (40) when said third set of vanes (52) are rotatably positioned adjacent to said outlet (36); said first, second, and third set of vanes (56, 60, 52) having a semicircular shape and being disposed in a circular pattern; said first, second, and third set of vanes (56, 60, 52) each including a set of horizontal vanes (66, 68, 64) and a set of vertical vanes (72, 74, 70); said set of horizontal vanes (66, 68, 64) being parallel to and spaced from one another and said set of vertical vanes (72, 74, 70) being parallel to and spaced from one another; said first, second, and third set of vanes (56, 60, 52) being fixed relative to said louver support (42); said horizontal vanes (66) of said first set of vanes (56) lying in a first plane (78), said horizontal vanes (68) of said second set of vanes (60) lying in a second plane (80) different from said first plane (78), and said horizontal vanes (64) of said third set of vanes (52) lying in a third plane (76) different from said first and second planes (78, 80); said vertical vanes (72) of said first set of vanes (56) lying in a fourth plane (84), said vertical vanes (74) of said second set of vanes (60) lying in a fifth plane (86) different from said fourth plane (84), and said vertical vanes (70) of said third set of vanes (52) lying in a sixth plane (82) different from said fourth and fifth planes (84, 86); first actuator means (88) operatively associated with said louver support (42) for rotating said louver support (42) about said support axis (44); a first motor (96) operatively associated with said first actuator (88) means for receiving energy and converting said energy to mechanical motion to rotate said louver support (42) about said support axis (44); a shutter (98) positioned between said housing (16) and said louver support (42) for rotation about said support axis (44) to prevent airflow from said inlet (34) to said outlet (36) when said shutter (98) is rotatably positioned adjacent to either said inlet (34) or said outlet (36); second actuator means (100) operatively associated with said shutter (98) for rotating said shutter (98) about said support axis (44); a second motor (108) operatively associated with said second actuator means (100) for receiving energy and converting said energy to mechanical motion to rotate said shutter (98); and a grille (38) for covering said outlet (36) of said housing (16).

20. A ventilation outlet assembly (10) for adjustably controlling airflow into a passenger compartment (12) of a motor vehicle, said assembly (10) comprising:

a housing (16) having an air inlet (28) and an air outlet (26) extending substantially in a common plane and defining a first air direction (40) of airflow extending from said inlet (28) through said outlet (26);

a louver support (42) rotatably supported within said housing (16) and across said airflow in said first air direction for rotation about a support axis (44), said support axis transverse to the airflow;

said louver support including a top support and bottom support adjacent said housing with the air flow between said top support and said bottom support;

at least two sets of vanes fixedly connected between said top support and said bottom support and including a first set of vanes spaced from a second set of vanes on said louver support, said first set of vanes extending from said louver support in a first vane direction when said first set of vanes are rotatably positioned adjacent to said air outlet (26), said first vane direction directing said air flow from said first air direction to a second air direction, and including said second set of vanes connected to said louver support, said second set of vanes extending from said louver support in a second vane direction when said second set of vanes are rotatably positioned adjacent to said air outlet (26);

said first set of vanes including a plurality of vanes connected to said louver support and extending across said outlet when said first set of vanes are aligned with said outlet.

21. An assembly as set forth in claim 20 further characterized by said first sets of vanes including a set of horizontal vanes and a set of vertical vanes, one of said sets of horizontal or vertical vanes connected to said louver support across said top support and said bottom support and the other of said sets of horizontal or vertical vanes connected to said set of vanes connected to said louver support.

22. An assembly as set forth in claim 21 further characterized by said second set of vanes including a plurality of parallel vanes connected to said louvers support and spaced from said first set of vanes.

23. An assembly as set forth in claim 21 further characterized by said second set of vanes radially spaced from and adjacent said first set of vanes and connected to said louver support, said second set including a set of horizontal vanes and a set of vertical vanes separate and independent from said first set of vanes.

* * * * *